US008837335B2

(12) United States Patent
Susitaival et al.

(10) Patent No.: US 8,837,335 B2
(45) Date of Patent: Sep. 16, 2014

(54) TIMESLOT ALLOCATION METHOD IN A WIRELESS TDD NETWORK

(75) Inventors: Riikka Susitaival, Helsinki (FI); Konstantinos Dimou, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 85 days.

(21) Appl. No.: 13/704,083

(22) PCT Filed: Jun. 24, 2010

(86) PCT No.: PCT/SE2010/050728
§ 371 (c)(1),
(2), (4) Date: Dec. 13, 2012

(87) PCT Pub. No.: WO2011/162656
PCT Pub. Date: Dec. 29, 2011

(65) Prior Publication Data
US 2013/0094387 A1    Apr. 18, 2013

(51) Int. Cl.
*H04L 5/14*      (2006.01)
*H04B 7/212*     (2006.01)

(52) U.S. Cl.
USPC ............................. 370/294; 370/337; 370/347

(58) Field of Classification Search
USPC .................. 370/294, 328, 337, 347
See application file for complete search history.

(56) References Cited

U.S. PATENT DOCUMENTS

| 2003/0214918 A1 | 11/2003 | Marinier | |
| 2009/0080386 A1* | 3/2009 | Yavuz et al. | 370/337 |
| 2010/0322118 A1* | 12/2010 | Fang et al. | 370/280 |
| 2011/0141952 A1* | 6/2011 | Wang et al. | 370/294 |
| 2013/0322303 A1* | 12/2013 | Manssour | 370/280 |
| 2013/0336176 A1* | 12/2013 | Rubin et al. | 370/280 |
| 2014/0010129 A1* | 1/2014 | Rubin et al. | 370/280 |
| 2014/0044024 A1* | 2/2014 | Zou et al. | 370/280 |

FOREIGN PATENT DOCUMENTS

| CN | 101345578 A | 1/2009 |
| DE | 19928579 A1 | 1/2001 |
| EP | 1229671 A2 | 8/2002 |
| WO | 2008157800 A1 | 12/2008 |

* cited by examiner

*Primary Examiner* — Andrew Lee
(74) *Attorney, Agent, or Firm* — Murphy, Bilak & Homiller, PLLC (57) ABSTRACT

Method and arrangement in a first base station for scheduling in a TDD wireless network, which wireless network comprises the first base station serving a user equipment, and a second base station. The method comprises detecting that the second base station uses a different TDD configuration, instructing the user equipment to provide a signal strength measurement report based on a signal received from the second base station, receiving the measurement report, and allocating resources to the user equipment based on the received measurement report. Thereby is allocation of resources in TTIs not having the same uplink-downlink direction in the first base station and the second base station respectively, is avoided for the user equipment, when the received signal strength measurement report indicates that such allocation is appropriate. Also, a method and arrangement in a user equipment for scheduling in a TDD wireless network is described.

16 Claims, 8 Drawing Sheets

Fig. 1

(PRIOR ART)

Fig. 2

(PRIOR ART)

TIMESLOT ALLOCATION METHOD IN A WIRELESS TDD NETWORK

TECHNICAL FIELD

The present invention relates to a method and arrangement in a base station and to a method and arrangement in a user equipment. In particular, it relates to a mechanism for scheduling resources in a wireless network.

BACKGROUND

The Long Term Evolution (LTE) is currently being standardized by 3GPP. As compared to earlier radio technologies, it provides higher peak data rates up to 300 Mbit/s, improved spectrum efficiency and reduced radio access delays. One key requirement in development of LTE has been spectrum flexibility; LTE can be operated in different spectrum allocations from 1.4 to 20 MHz and in paired or unpaired spectrum. With the paired spectrum, the Frequency Division Duplex (FDD) mode uses different carrier frequencies for downlink and uplink, whereas with the unpaired spectrum, the Time Division Duplex (TDD) mode uses a single carrier frequency and separation of downlink and uplink in time. Regardless of this fundamental difference, the basic design principle in LTE has been that FDD and TDD should be as similar as possible.

Similar to FDD, the TDD radio frame consists of 10 subframes, each having the length of 1 ms. In a radio frame, a subframe can be either an uplink (UL), downlink (DL) or a special subframe.

The expression "downlink" is in the present context used to specify the transmission from the base station to the user equipment, while the expression "uplink" is used to denote the transmission from the user equipment to the base station.

A general principle is that the subframes 0 and 5 may be downlink subframes, subframe 2 may be an uplink subframe, and subframe 1 may be a special subframe. As can be seen from FIG. 1, the special frame comprises a downlink part (DwPTS), a guard period (GP) and an uplink part (UpPTS). The downlink part of the special frame can be considered as a normal downlink subframe for data and control but with a reduced number of data symbols. The guard period comprises a number of idle symbols when nobody is transmitting. Finally, the uplink part of the special frame is considerably shorter than the downlink part and is primarily used for sounding and random access preamble transmission, rather than for user data transmission.

Figure 1:
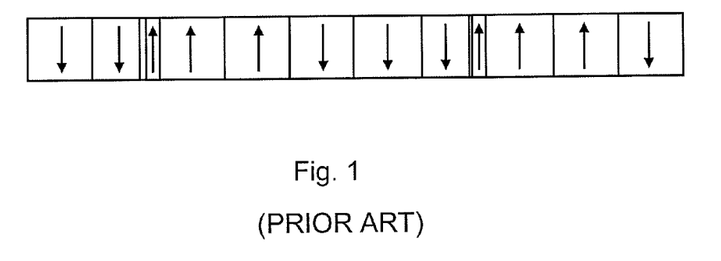
FIG. 1 is a schematic block diagram illustrating a TDD radio frame according to prior art.

In FIG. 1, the downlink and uplink allocation in subframes within a radio frame is illustrated for Configuration 1. The direction of the arrow in each subframe indicates uplink or downlink respectively. The subframes without arrows are guard periods.

3GPP has defined 7 downlink-uplink configurations, which are listed in Table 1. The configurations cover a wide range of allocations from the downlink focused 9:1 configuration 5, to the uplink focused 2:3 configuration 0. In the table, the DL:UL ratio refers to how the downlink and uplink periods are repeated. For example, with Configuration 1 having DL:UL ratio 3:2, there are three downlink or special subframes followed by two uplink subframes.

TABLE 1

| Configuration | DL:UL |
|---|---|
| 0 | 2:3 |
| 1 | 3:2 |

TABLE 1-continued

| Configuration | DL:UL |
|---|---|
| 2 | 4:1 |
| 3 | 7:3 |
| 4 | 8:2 |
| 5 | 9:1 |
| 6 | 3:3:2:2 |

Figure 2:
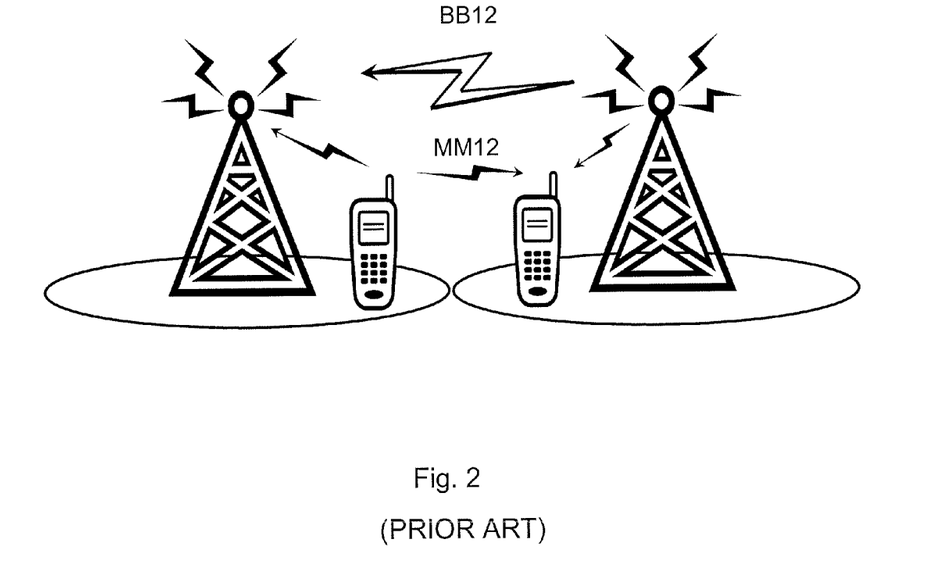
FIG. 2 is a schematic block diagram illustrating interference in a wireless network according to prior art.

The selection of TDD uplink-downlink configuration is done based on known traffic characteristics and asymmetries of the network. The selection should be done in such a way that the available spectrum is utilized most efficiently. However, if downlink and uplink co-exists in the neighbouring cells, significant interference can occur. A radio base station (RBS) receives interference from other base stations and a user equipment (UE) receives interference from other user equipments, see FIG. 2. Interference is in the present context anything which alters, modifies, or disrupts a signal as it travels along a channel between a source and a receiver. The term typically refers to the addition of unwanted signals to a useful signal. Interference may typically but not always be distinguished from noise, for example white thermal noise.

Interference may be measured by measuring a signal-to-interference ratio (S/I or SIR), also known as the carrier-to-interference ratio (C/I, CIR), which is the quotient between the average received modulated carrier power, S or C respectively, and the average received co-channel interference power I, i.e. cross-talk, from other transmitters than the useful i.e. information carrying signal.

In order to avoid base station-to-base station and user equipment-to-user equipment interference, the same TDD uplink-downlink allocation is commonly used in the entire wireless network, or at least in an entire geographical region. Therefore, an adaptation to the instantaneous load in a particular cell is seldom possible. However, in many situations one cell can be uplink capacity limited whereas another cell is downlink limited. Thus, having a dynamic TDD configuration would improve the performance of the network. In addition, extreme uplink-downlink configurations could be utilized more efficiently because the entire region would not need to follow the same configuration.

From the standard point of view, it is possible to have different uplink-downlink TDD configurations in the neighbouring cells in a network supporting TDD access mode. However, in practice this may be difficult without a dedicated solution for interference management.

According to previously known solutions for base station-to-base station interference management, the neighbouring cells within a network can have different TDD uplink-downlink configurations. The Time to Transmit Intervals (TTIs) which have different link direction (uplink/downlink) in neighbour cells than in the own cell are called "flexible" TTIs. This term is used also in this document.

In the previously known interference management solution, the base station-to-base station interference (BBI) between neighbour cells is firstly estimated. If this interference is below a given threshold, preferably close to 0 dB, the data transmission is possible in the flexible TTI even the uplink-downlink direction is different. For neighbour cells not satisfying this condition and having different uplink/downlink direction, flexible TTIs are not used for data transmission.

Figure 3:
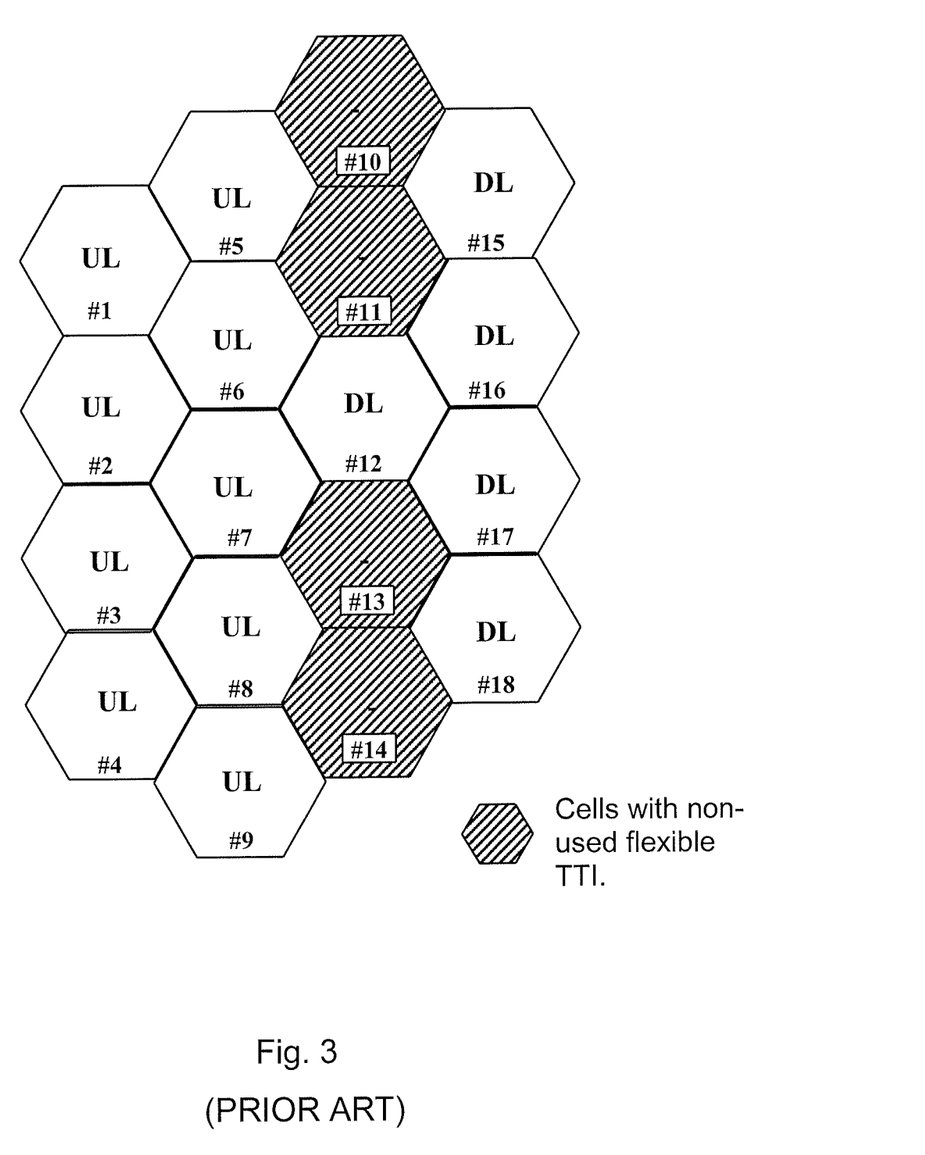
FIG. 3 is a schematic block diagram illustrating dynamic TDD configuration for neighbour cells in a wireless network according to prior art.

An example of dynamic TDD configuration solution can be seen in FIG. 3. In this Figure, it can be seen that cells #6 and #7 have uplink in the flexible TTI, whilst their neighbour #12 has downlink. Data transmissions are possible in the flexible TTIs since the BBI interference between these respective sites is below a given threshold, probably very close to 0 dB. For neighbour cells which do not satisfy the BBI condition, user equipments are not scheduled on the flexible TTI. This is the case for cells #8 and #13, #14 in FIG. 3.

However, even if BBI is close to 0 dB, there is no guarantee that user equipment-to-user equipment interference or mobile-to-mobile (MMI) interference is avoided. This can be seen in FIG. 2, where the channel BB12 is not necessarily correlated with the channel MM12. It is thus a need to protecting user equipment from MMI.

SUMMARY

It is therefore an object of the present invention to obviate at least some of the above described disadvantages and to provide a mechanism for improving the performance in a wireless network.

According to a first aspect of the present invention, the object is achieved by a method in a first base station. The method aims at scheduling in a Time Division Duplex, TDD, wireless network. The wireless network comprises the first base station, acting as serving base station for a user equipment, and a second base station. The method comprises detecting that the second base station uses a different TDD configuration than the first base station. Further, the method also comprises instructing the user equipment to generate and provide a signal strength measurement report based on a signal received by the user equipment from the second base station. Also, the method further comprises, in addition, receiving the signal strength measurement report from the user equipment. Additionally, the method also comprises, further, allocating resources to the user equipment based on the received signal strength measurement report.

Thereby allocation of resources in Time to Transmit Intervals (TTIs) not having the same uplink-downlink direction in the first and second base stations is avoided for the user equipment, when the received signal strength measurement report indicates that such avoidance is appropriate. In other words, the first base station determines whether to avoid allocating resources to the user equipment on TTIs that have different link directions at the first and second base stations, in dependence on the signal strength measurement report. For example, if the signal strength measurement report indicates that a ratio of signal strengths of the first base station to the second base station, as seen at the user equipment, is below a threshold value, user scheduling avoids allocating resources to the user equipment that are in TTIs for which the link direction differs between the first and second base stations. Conversely, if the ratio exceeds the threshold, user scheduling does not avoid allocating resources to the user equipment that are in TTIs for which the link direction differs between the first and second base stations.

According to a second aspect of the present invention, the object is achieved by an arrangement in a first base station. The arrangement aims at scheduling resources in a Time Division Duplex, TDD, wireless network. The wireless network comprises the first base station, acting as a serving base station for a user equipment, and a second base station. The arrangement comprises a detection unit. The detection unit is configured to detect that the second base station uses a different TDD configuration than the first base station. Further, the arrangement comprises a transmitter. The transmitter is configured to transmit an instruction to the user equipment. The instruction to transmit to the user equipment is an instruction for triggering the user equipment to generate and provide a signal strength measurement report based on a signal received from the second base station. Also, the arrangement comprises a receiver. The receiver is configured to receive the signal strength measurement report from the user equipment. Additionally, the arrangement further comprises an allocating unit. The allocating unit is configured to allocate resources to the user equipment. The allocation is based on the received signal strength measurement report, such that allocation of resources in Time to Transmit Intervals, TTIs, not having the same uplink-downlink direction in the first base station and the second base station respectively, is avoided for the user equipment, when the received signal strength measurement report indicates that such allocation is appropriate.

According to a third aspect of the present invention, the object is achieved by a method in a user equipment. The method aims at scheduling in a Time Division Duplex, TDD, wireless network. The wireless network comprises a first base station, acting as a serving base station for the user equipment, and a second base station. The method comprises receiving an instruction to generate and provide a signal strength measurement report based on a signal received from the second base station. Further, the method additionally also comprises generating the signal strength measurement report, based on the signal strength of a signal received from the second base station. Also, the method further in addition comprises transmitting the generated signal strength measurement report to the first base station. Thereby is the first base station enabled to allocate resources, such that allocation of resources in Time to Transmit Intervals, TTIs, not having the same uplink-downlink direction in the first base station and the second base station respectively, is avoided for the user equipment, when the received signal strength measurement report indicates that such allocation is appropriate.

According to a fourth aspect of the present invention, the object is achieved by an arrangement in a user equipment. The arrangement is configured for scheduling in a Time Division Duplex, TDD, wireless network. The wireless network comprises a first base station, acting as a serving base station for the user equipment, and a second base station. The arrangement comprises a receiver. The receiver is configured to receive an instruction to generate and provide a signal strength measurement concerning the signal strength of a signal received from the second base station. The arrangement further comprises a report generator. The report generator is configured to generate the signal strength measurement report, based on the signal strength of a signal received from the second base station. In addition the arrangement also comprises a transmitter. The transmitter is configured to transmit the signal strength measurement report to the first base station. Thereby is the first base station enabled to allocate resources, such that allocation of resources in Time to Transmit Intervals, TTIs, not having the same uplink-downlink direction in the first base station and the second base station respectively, is avoided for the user equipment, when the received signal strength measurement report indicates that such allocation is appropriate.

One advantage of this invention is that mobile to mobile interference is effectively mitigated and thus different TDD configurations are possible, even among or between neighbouring cells in a wireless network. Such capability improves the usage of radio resources in wireless networks.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and arrangement in a base station and as a method and arrangement in a user equipment, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 4A:
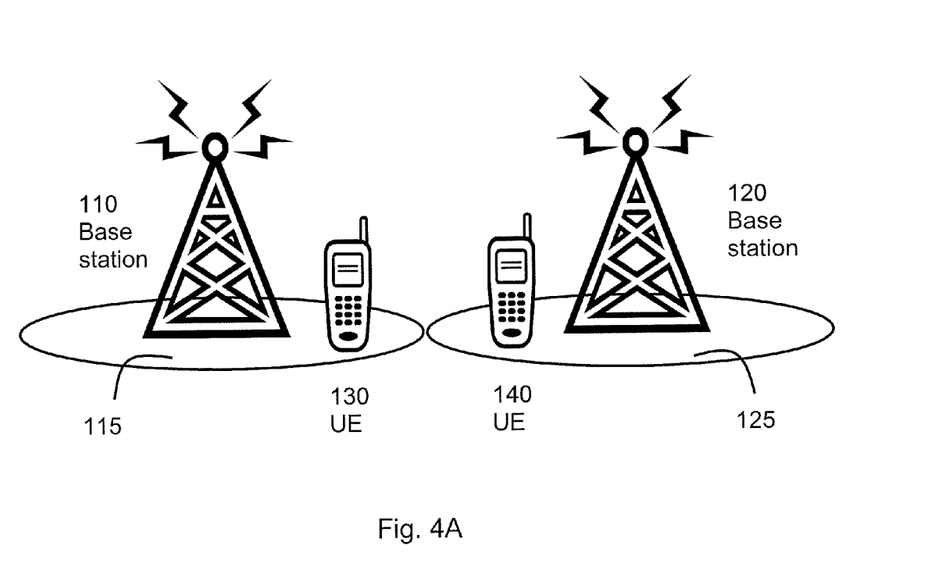
FIG. 4A is a schematic block diagram illustrating a wireless network according to some embodiments of the present invention.

FIG. 4A depicts a wireless network 100, such as e.g. 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

In the following, the present methods and arrangements are further elaborated with specific reference to LTE networks in Time Division Duplex (TDD) mode. Thus the wireless network 100 is described as an LTE system throughout the rest of the description, for enhanced comprehension and readability. However, the corresponding concepts may also be applied in other wireless networks 100, based on other radio access technology.

The wireless network 100 comprises a first base station 110 in a first cell 115 and a second base station 120 in a second cell 125. The first base station 110 is serving base station for a first user equipment 130, while the second base station 120, which may be a neighbour base station in relation to the first base station 110, is serving base station for a second user equipment 140. The user equipments 130, 140 are arranged to communicate with each other. The user equipment 130 is configured to transmit radio signals comprising information to be received by the first base station 110 and/or the second base station 120, depending e.g. on the geographical position of the user equipment 130 and/or load balancing between the base stations 110, 120, etc.

The purpose of the illustration in FIG. 4A is to provide a general overview of the present methods and the functionalities involved.

The first base station 110 and the second base station 120 may communicate with each other over an interface, which may be a backhaul network interface comprising any, some or all of e.g. a cellular modem, a fiber optic link, a GPRS modem, an radio frequency transceiver, a WIMAX link, an Evolution-Data Optimized (EV-DO) link, and/or a broadband internet connection, according to some embodiments. Further, the first base station 110 and the second base station 120 may communicate with each other over an intra base station communication link interface such as e.g. an X2 interface.

The first and second base stations 110, 120 may be referred to as e.g. base stations, Radio Base Stations (RBSs), macro base stations, NodeBs, evolved Node Bs (eNBs, or eNode Bs), base transceiver stations, Access Point Base Stations, base station routers, micro base stations, pico base stations, femto base stations, Home eNodeBs, relays and/or repeaters, or any other network node configured for communication with the user equipment 130, 140 over a wireless interface, depending e.g. of the radio access technology and terminology used. In the rest of the description, the term "first base station" and "second base station" will be used for the first base stations 110 and second base station 120, in order to facilitate the comprehension of the present methods and arrangements.

The user equipment 130, 140 may be represented by e.g. a wireless communication terminal, a mobile station (MS), a mobile cellular phone, a Personal Digital Assistant (PDA), a wireless platform, a laptop, a computer or any other kind of device configured to communicate wirelessly with the first base station 110 and/or the second base station 120.

The present methods enable the use of dynamic uplink/downlink TDD configuration efficiently between neighbour cells 115, 125. When within the present context the expression "neighbour" is used for cells 115, 125 and/or base stations 110, 120, it is intended to express a relationship between the cells 115, 125 and/or base stations 110, 120 in a radio sense. Thus two cells 115, 125 and/or base stations 110, 120 may be referred to as neighbours, even thou they are not necessarily neighbours in a geographical sense. However, cells 115, 125 and/or base stations 110, 120 referred to as neighbours in the present context may, depending on e.g. geographical topology and/or local radio propagation conditions, besides being neighbours in a radio sense, also be neighbours in a geographical sense.

According to some embodiments, the user equipment 130, served by the first base station 110 in a certain cell 115, may measure the signal strength of a signal received from the neighbouring cell 125. Based on the signal measurement/s, it is decided by the first base station 110, which user equipment 130, 140 are located close to the borders of the neighbour cell 125, having different TDD configuration as compared to the serving cell 115. These user equipment 130, 140 may not be scheduled for data transmission in the subframes, not having the same uplink-downlink direction between neighbour cells 115, 125. Thus, according to some embodiments, user equipment 130, 140 situated close to a cell border between neighbour cells 115, 125 are allocated resources on subframes, not having the same uplink-downlink direction between neighbour cells 115, 125. Further, according to some embodiments may user equipment 130, 140 not situated close to a cell border between neighbour cells 115, 125 are allocated resources on subframes, having the same uplink-downlink direction between neighbour cells 115, 125.

Figure 4B:
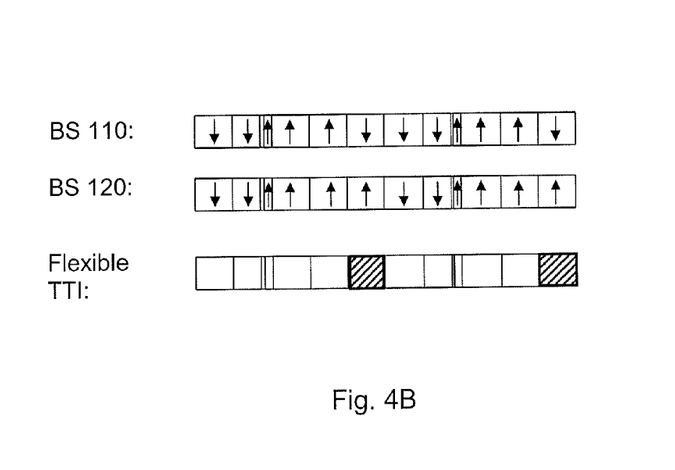
FIG. 4B is a schematic block diagram illustrating dynamic TDD configuration for neighbour cells in a wireless network according to some embodiments of the present invention.

FIG. 4B illustrates exemplary radio frames of the first base station 110, the second base station 120 and also illustrates an example of flexible TTI, where one radio frame in one of the cells 115, 125 has a subframe in downlink while the other radio frame in the neighbouring cells 115, 125 has a subframe in uplink.

According to embodiments of the present solution, when different TDD configurations are used in neighbour cells 115, 125, a check is performed whether some user equipments 130 are located in the mutual borders of the cells 115, 125 and if so, the cells 115, 125 do not allocate resources to those user equipments 130 in the flexible TTI. The present method to reduce mobile-to-mobile interference in a dynamic TDD configuration scenario may according to some embodiments be described by the following exemplary actions:

Action 1

A first base station 110 serving a first cell 115 detects that a neighbour second cell/s 125 has/have a different TDD configuration than what is used within the first cell 115. The cell ID, or some other equivalent way of identifying the neighbour second cell/s 125 is signalled to the user equipments 130 within the cell 115. The neighbour cell ID may be denoted by a parameter Cell_neighbour.

Action 2

A user equipment 130, situated in the first cell 115, served by first base station 110 monitors the ratio of the Reference Signal Received Power (RSRP) of the serving cell 115 to the RSRP of the neighbour cell Cell_neighbour with the different TDD configuration. In the case the ratio is below a certain threshold level value, Threshold_1, the user equipment 130 may reports this event to its serving first base station 110, by sending a measurement report uplink to the first base station 110.

Action 3

The serving first base station 110 may allocate resources in the flexible TTI to those user equipments 130 that have not reported that the Threshold_1 is exceeded, as described in the action 2, while the user equipments 130 that have reported that the Threshold_1 is exceeded, may be allocated resources in the TTI not having the same uplink-downlink direction in the first base station 110 and the second base station 120 respectively, is avoided for the user equipment 130, when the received signal strength measurement report indicates that such allocation is appropriate.

Figure 5:
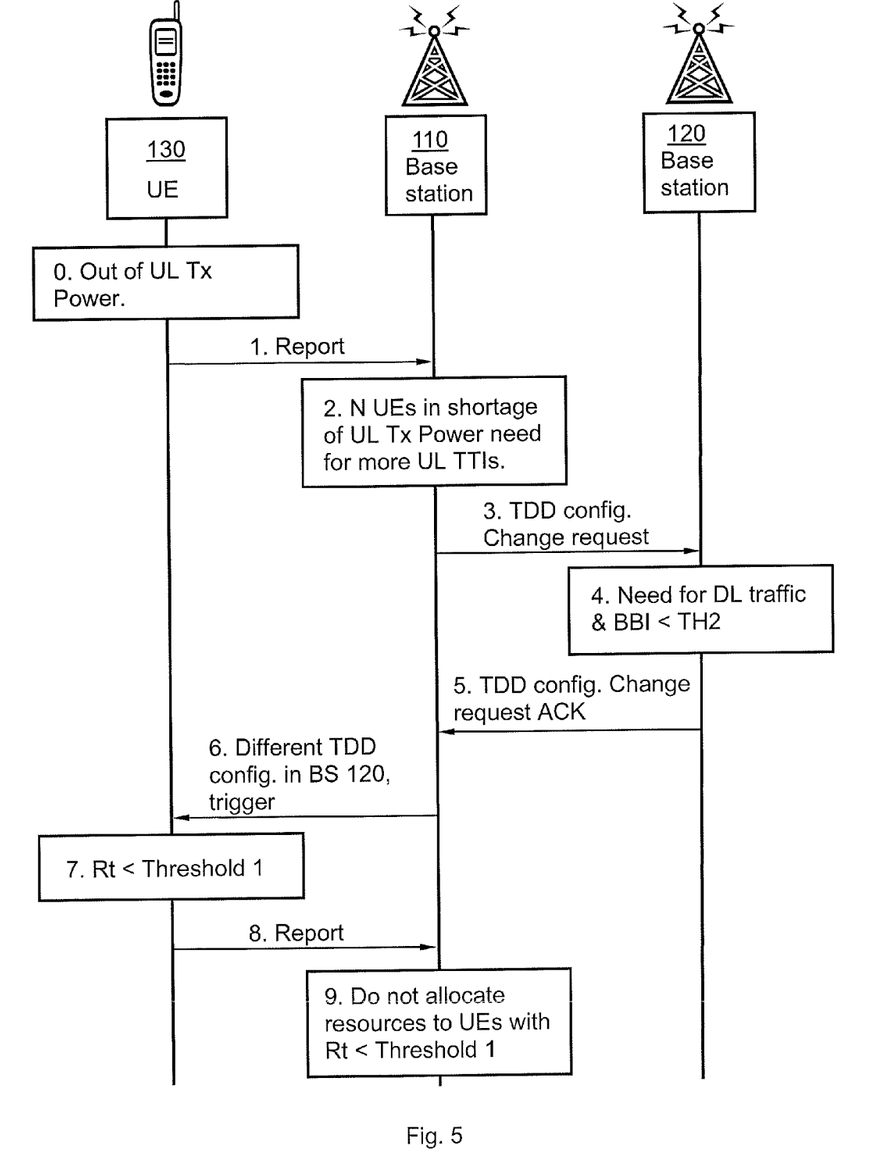
FIG. 5 is a combined flow chart and block diagram illustrating an embodiment of the present method.

FIG. 5 is a flow chart illustrating an embodiment of the present method, in a number of actions 0-9, to be performed within different entities 110, 120, 130 in the network 100. FIG. 5 presents a general overview of the present invention and put it into an exemplary environmental context. The request for a change in TDD configuration is triggered by one cell 115. The trigger, or instruction, can be based on, e.g. the fact that some user equipments 130 within the given cell 115 are out of uplink transmission power in a first action 0.

Action 0

A user equipment 130, within the first cell 115, served by a first base station 110 is detecting that it is out of uplink transmission power.

Hence, an increase in the number of uplink TTIs may increase the accumulated energy received by the first base station 110, that is, the transmission power times the transmission time. This may help the user equipments 130 in transmitting their data with reasonable rates without being in shortage of uplink transmission power.

Action 1

The user equipment 130 transmits a report to the first base station 110, comprising the detected information that the user equipment 130 is out of uplink transmission power.

Action 2

The first base station 110 receives the report from user equipment 130, and possibly from other user equipment within the first cell 115. The first base station 110 may e.g. compile the reports and for example compare it with a threshold value/s that may be used as a base for deciding to change TDD configuration.

Hence, upon decision at a given cell 115 that there may be a need for higher amount of uplink TTIs, action 2.

The presently described algorithm may be based on load requirements within a given cell 115, 125. The triggering of the TDD configuration change may be performed.

Action 3

The first base station 110 transmits a message, a TDD configuration request to its neighbour base station 120 asking for a new TDD configuration, i.e. for more uplink TTIs, based on the decision made in action 2.

Action 4

The TDD configuration request is received at the second base station 120.

Some of the neighbour base station 120 might consent to this change. This may be because the user equipment and/or radio traffic in the second cell 125 served by the second neighbour base station 120 has another need for TDD configuration, due to different uplink-downlink traffic. That considering that the BBI between neighbour cells 115, 125 may be known, or can be estimated, there might be cells 115, 125 for which the BBI is below a given Threshold_2 and hence these neighbour cells 115, 125 can maintain their existing TDD configuration by allowing the TDD configuration change of their neighbour cell 125.

There might be cases though where neighbour cells 115, 125 do not consent to this change. There may be reasons for this, such as the neighbour cells 115, 125 need all of their downlink resources in the examined scenario and the BBI is too high to allow different TDD configurations. Consequently, the neighbour cells 115, 125 may reject the TDD configuration change request, according to some embodiments.

Some of the neighbour cells 115, 125 might consent to the TDD configuration change when they do not have high need to maintain their downlink resources in the examined scenario. Thus they consent to the TDD configuration change request by muting the flexible TTIs.

Action 5

In the exemplary case described above where the neighbour cell 115, 125 does not want to mute their flexible TTIs, but the BBI is below Threshold_2, the two neighbour cells 115, 125 can have different TDD configurations. In this case the message TDD Configuration Request Ack may be transmitted to the cell 115 that sent the request.

Action 6

The cell having issued the TDD configuration change request broadcasts or unicast the measurement instruction to the user equipment 130 in the cell 115. Thus a trigger is sent to the user equipment 130 within the cell 115, to measure the signal strength.

The following information may be transmitted according to some embodiments: the new TDD configuration, the cell ID of the neighbour cell 125, Cell_neighbour, having different TDD configuration, the value of the threshold, Threshold_1, a request to monitor the ratio, Rt, i.e:

$$Rt = \frac{RSRP(\text{Serving\_cell})}{RSRP(\text{neighbour\_cell})} \quad (1)$$

where RSRP (Serving_cell) may be the Reference Signal Received Power of the serving base station 110, while RSRP (neighbour_cell) may be the Reference Signal Received Power of the neighbour base station 120. A request may be sent to the user equipment 130 to report whenever:

$$Rt < \text{Threshold\_1} \quad (2)$$

may be performed. Also the subframe index, in which the user equipment 130 should do RSRP measurements, can be informed by the serving cell.

Action 7

User equipment 130 in cell 115 may monitor the ratio Rt and whenever the ratio satisfies the condition (2) in action 6, i.e.

$$Rt < \text{Threshold\_1} \quad (2)$$

it may report this event to its serving base station 110 in action 8.

Action 8

The performed signal measurement report is sent to the first base station 110.

Action 9

The serving base station 110 may not allocate resources in the flexible TTIs to the user equipment 130 having reported this event.

Further, this procedure, i.e. according to at least some of the actions 0-9 may be applied in the neighbour cell 125. The cell 125 may request a user equipment 140 to monitor the ratio Rt where the serving cell is cell 125 and the neighbour cell is cell 115. Whenever the ratio satisfies the condition (2) in action 7, the user equipment 140 may report this event to its serving base station 120 in action 8. The serving base station 120 may not allocate resources in the flexible TTIs to the user equipment 140 having reported this event.

Figure 6:
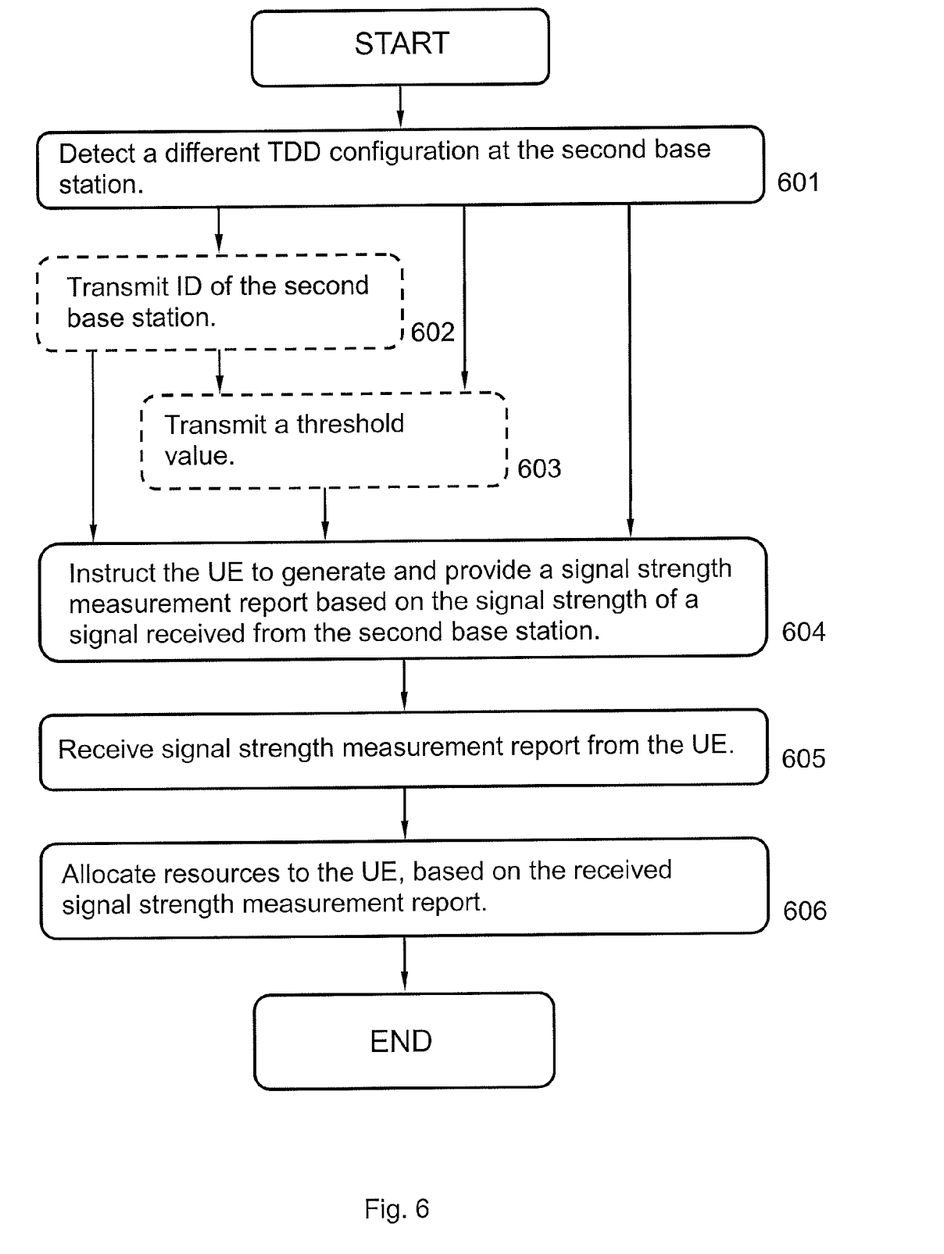
FIG. 6 is a flow chart illustrating an embodiment of the present method.

FIG. 6 is a flow chart illustrating embodiments of method actions 601-605 performed in a first base station 110. The method aims at scheduling resources in a Time Division Duplex, TDD, wireless network 100. The wireless network 100 comprises the first base station 110, acting as serving base station for a user equipment 130, and a second base station 120. The wireless network 100 may be e.g. a Long Term Evolution, LTE radio network. The user equipment 130 may be e.g. a mobile telephone.

To appropriately schedule in a wireless network 100, the method may comprise a number of actions 601-605.

It is however to be noted that some of the described method actions, e.g. action 603, is optional and comprised within some embodiments. Further, it is to be noted that the method actions 601-605 may be performed in a somewhat different chronological order and that some of them, e.g. action 602 and 603, may be performed simultaneously or in a rearranged chronological order. The method may comprise the following actions:

Action 601

It is detected that the second base station 120 uses a different TDD configuration than the first base station 110.

The detection that the second base station 120 uses a different TDD configuration than the first base station 110 may be performed by receiving a TDD configuration change request from the second base station 120, according to some embodiments. Such scenario may appear when/if the second base station 120 would like to change TDD configuration.

However, according to some embodiments, the detection that the second base station 120 uses a different TDD configuration than the first base station 110 may be performed by receiving a TDD configuration change request acknowledgement from the second base station 120. Such scenario may appear when/if the first base station 110 would like to change TDD configuration and send a request for doing so to the second base station 120.

The detection that the second base station 120 uses a different TDD configuration than the first base station 110 may be performed by estimating the base station-to-base station interference BBI between the first base station 110 and the second base station 120, according to some embodiments. The estimated BBI may be compared to a threshold limit value. If the estimated BBI exceeds the threshold limit value, it may be assumed that the second base station 120 is using a different TDD configuration than the first base station 110.

Further, information may be received from a network node comprised within the wireless network 100 according to some embodiments, informing the first base station 110 that the second base station 120 uses a different TDD configuration than the first base station 110.

Action 602

This action is optional and may be performed within some embodiments.

A signal strength threshold value may be transmitted to the user equipment 130. The signal strength threshold value may be set to 3 dB according to some embodiments.

Action 603

The user equipment 130 is instructed to generate and provide a signal strength measurement report, based on a signal received by user equipment 130 from the second base station 120.

The signal strength measurement report may according to some embodiments be further based on a signal received in the user equipment (130) from the first base station 110 and may comprise a ratio Rt between the two measurements, such that:

$$Rt = \frac{RSRP(\text{Serving\_cell})}{RSRP(\text{neighbour\_cell})}$$

where RSRP (Serving_cell) may be the Reference Signal Received Power of the serving first base station 110, while RSRP (neighbour_cell) may be the Reference Signal Received Power of the second base station 120.

However, according to some embodiments may, instead of the downlink Reference Signal Received Power received from the first base station 110 and the second base station 120 respectively, instead any similar value such as e.g. Reference Signal Received Quality (RSRQ) or Receive Signal Strength Indication (RSSI) be measured.

The instruction may according to some embodiments be further specified such that the user equipment 130 is instructed to report to the first base station 110 whenever:

$$Rt < \text{signal strength threshold value}$$

The identity of the detected second base station 120 is also transmitted to the user equipment 130, e.g. together with said instruction, thereby enabling the user equipment 130 to correctly identify the second base station 120.

The instruction sent to the user equipment 130 to generate and provide a signal strength measurement report may according to some embodiments be further specified such that the signal strength measurement report is to be sent from the user equipment 130 to the first base station 110 when the signal strength measurement report is lower than the signal strength threshold value, transmitted in the optional action 602.

The instruction sent to the user equipment 130 to generate and provide a signal strength measurement report may according to some embodiments be further specified such that the user equipment 130 is instructed to generate the signal strength measurement report on a certain time interval.

Thus the instruction, or trigger as it also may be referred to as, may be sent to the user equipment 130 together with the identity of the second base station 120, in a radio transmission. Optionally may the instruction and the second base station identity be provided in a downlink assignment, according to some embodiments.

Action 604

The signal strength measurement report is received from the user equipment 130.

The signal strength measurement report received from the user equipment 130 may according to some embodiments be compared with a signal strength threshold value. The signal strength threshold value may be set to e.g. 3 dB. However, the signal strength threshold value may be set to another value e.g. 1 dB, 1.5 dB, 2 dB, 4 dB, 5 dB, or any other value considered appropriate.

The optional signal strength threshold value may be e.g. predetermined and/or pre-stored within the first base station 110. Alternatively, the signal strength threshold value may be dynamically set by the first base station 110 or e.g. obtained from a look-up table, just to mention some possible options.

Action 605

Resources are allocated to the user equipment 130 based on the received signal strength measurement report, such that allocation of resources in Time to Transmit Intervals, TTIs, not having the same uplink-downlink direction in the first base station 110 and the second base station 120 respectively, is avoided for the user equipment 130, when the received signal strength measurement report indicates that such allocation is appropriate.

It may, according to some embodiments, be considered appropriate to avoid allocating resources to the user equipment 130 in TTIs not having the same uplink-downlink direction in the first base station 110 and the second base station 120 respectively, if the signal strength measurement report is lower than the signal strength threshold value.

The resources allocated to the user equipment 130, may comprise allocating Time to Transmit Intervals, TTIs, having the same link direction, uplink or downlink, in the first base station 110 and in the second base station 120, for scheduling resources to the user equipment 130, if the signal strength measurement report provided by the user equipment 130 is lower than the signal strength threshold value.

The resources allocated to the user equipment 130, may according to some embodiments comprise allocating Time to Transmit Intervals, TTIs, not having the same link direction, uplink or downlink, in the first base station 110 and in the second base station 120, for scheduling resources to the user equipment 130, if the signal strength measurement report provided by the user equipment 130 exceeds the signal strength threshold value.

According to some embodiments may the resources to be allocated to the user equipment 130, comprise Time to Transmit Intervals, TTIs, having the same link directions, uplink or downlink, in the first base station 110 and the second base station 120, respectively, for scheduling the user equipment 130.

However, according to some embodiments may TTIs, having the same link direction, uplink or downlink, in the first base station 110 and in the second base station 120, for scheduling resources to the user equipment 130, if the signal strength measurement report provided by the user equipment 130 is lower than the signal strength threshold value.

However, according to some embodiments may TTIs, not having the same link direction, uplink or downlink, in the first base station 110 and in the second base station 120, for scheduling resources to the user equipment 130, if the signal strength measurement report provided by the user equipment 130 exceeds the signal strength threshold value.

Such user equipment 130 may comprise user equipment not considered to be influenced by interference from the second base station 120, e.g. by providing a signal strength measurement report, based on e.g. a weak signal received from the second base station 120. For example may the ratio between the RSRP of the serving base station 110 and the RSRP of the second base station 120 be high, for example exceeding the threshold value Rt.

Thereby may base station-to-base station interference between neighbour base stations 110, 120 having different TDD configuration may be reduced or even omitted, leading to an improved general performance within the wireless communication system 100.

Figure 7:
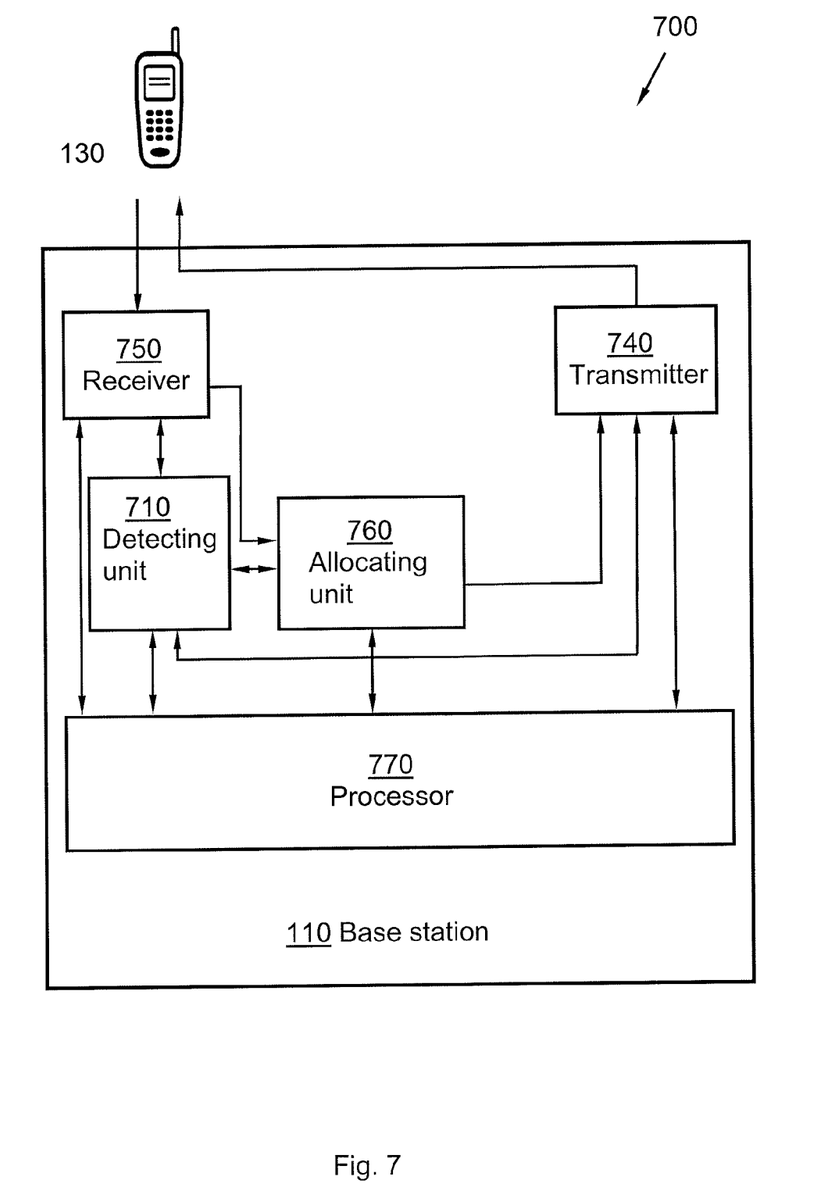
FIG. 7 is a schematic block diagram illustrating an arrangement according to some embodiments.

FIG. 7 schematically illustrates an arrangement 700 in a first base station 110. The arrangement 700 is configured for scheduling in a Time Division Duplex, TDD, wireless network 100. The wireless network 100 comprises the first base station 110, acting as serving base station for a user equipment 130, and a second base station 120. The arrangement 700 is adapted to perform any, some or all of the actions 601-605 in order to schedule resources in the TDD wireless network 100. The wireless network 100 may be e.g. a LTE radio network. The user equipment 130 may be e.g. a mobile telephone. The first and second base stations 110, 120 may be evolved node Bs, eNBs, according to some embodiments.

In order to perform the method actions 601-605 correctly, the arrangement 700 comprises e.g. a detection unit 710, configured to detect that the second base station 120 uses a different TDD configuration than the first base station 110. The detection unit 710 may be represented by and/or comprised within a processor, processing circuit or other processing logic that may interpret and execute instructions and being appropriately configured. Also, the arrangement 700 comprises a transmitter 740. The transmitter 740 is configured to transmit an instruction to the user equipment 130, instructing the user equipment 130 to generate and provide a signal strength measurement report based on a signal received from the second base station 120. Furthermore, the arrangement 700 comprises a receiver 750. The receiver 750 is configured to receive the signal strength measurement report from the user equipment 130. Additionally, the arrangement 700 also comprises an allocating unit 760. The allocating unit 760 is configured to allocate resources to the user equipment 130, based on the received signal strength measurement report. Thereby may allocation of resources in Time to Transmit Intervals, TTIs, not having the same uplink-downlink direction in the first base station 110 and the second base station 120 respectively, is avoided for the user equipment 130, when the received signal strength measurement report indicates that such allocation is appropriate. The allocating unit 760 may be represented by and/or comprised within a processor, processing circuit or other processing logic that may interpret and execute instructions and being appropriately configured.

In addition, the base station arrangement 700 may comprise a processor 770. The processor 770 may be configured for scheduling in a TDD wireless network 100.

The processor 770 may be represented by e.g. a Central Processing Unit (CPU), a microprocessor, or other processing logic that may interpret and execute instructions. The processor 770 may perform all data processing functions for inputting, outputting, and processing of data including data buffering and device control functions, such as call processing control, user interface control, or the like.

It is to be noted that any internal electronics of the base station arrangement 700, not completely necessary for understanding the present method according to the actions 601-605 has been omitted from FIG. 7, for clarity reasons.

Further, it is to be noted that some of the described units 710-770 comprised within the arrangement 700 in the first base station 110 are to be regarded as separate logical entities but not with necessity separate physical entities. To mention just one example, the receiver 750 and the transmitter 740 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first base station 110 and the user equipment 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The actions 601-605 in the first base station 110 may be implemented through one or more processors 770 in the arrangement 700, together with computer program code for performing the functions of any, some or all of the present actions 601-605. Thus a computer program product, comprising instructions for performing the actions 601-605 in the arrangement 700 may perform scheduling in the TDD wireless network 100, when the computer program product is loaded into the processor 770.

The computer program product mentioned above may be provided for instance in the form of a data carrier carrying computer program code for performing the method actions according to the present solution when being loaded into the processor unit 770. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Figure 8:
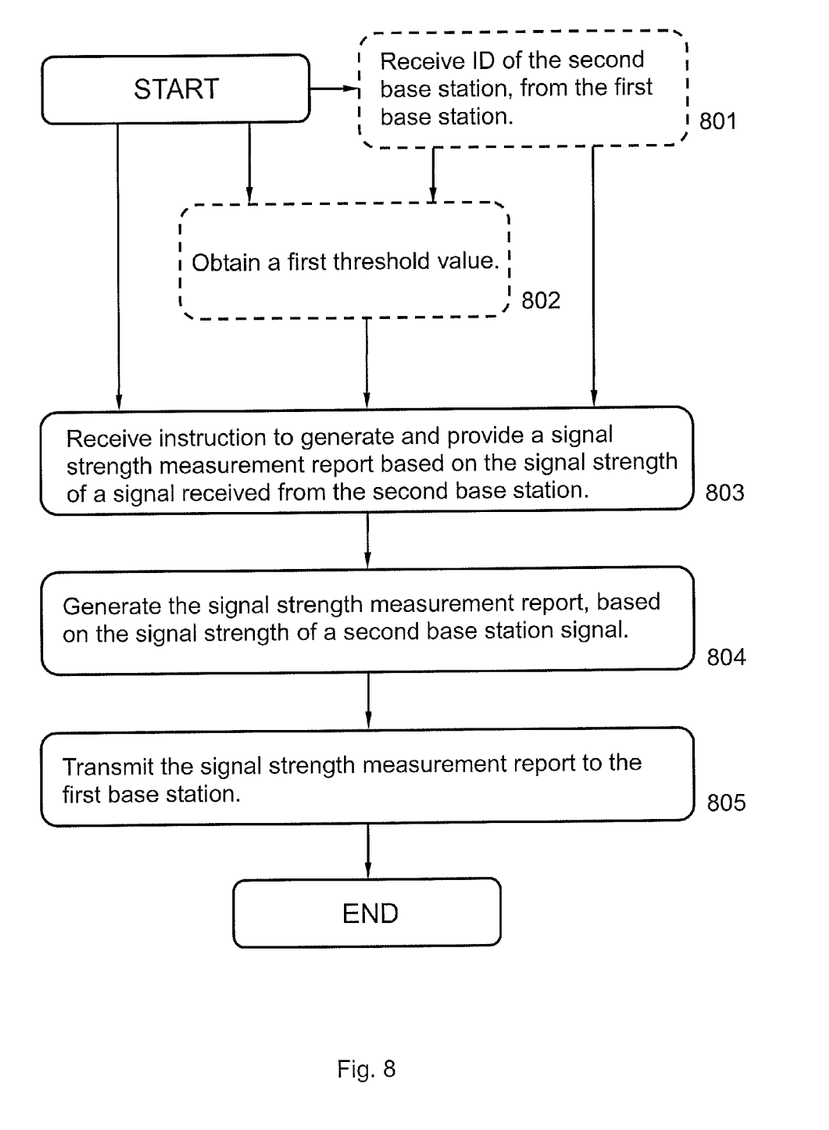
FIG. 8 is a flow chart illustrating an embodiment of the present method.

FIG. 8 is a flow chart illustrating embodiments of method actions 801-804 performed in a user equipment 130. The method aims at scheduling in a Time Division Duplex, TDD, wireless network 100. The wireless network 100 comprises a first base station 110, acting as serving base station for the user equipment 130, and a second base station 120. The wireless network 100 may be e.g. a LTE radio network. The user equipment 130 may be e.g. a mobile telephone.

To appropriately schedule in a wireless network 100, the method may comprise a number of method actions 801-804.

It is however to be noted that some of the described method actions, e.g. action 801 or 802, are optional and may be comprised within some embodiments. Further, it is to be noted that the method actions 801-804 may be performed in a somewhat different chronological order and that some of them, e.g. actions 801 and 803, may be performed simultaneously or in a rearranged chronological order. The method may comprise the following actions:

Action 801

This action is optional and may be performed within some embodiments.

A signal strength threshold value may be obtained. According to some embodiments may the signal strength threshold value be provided by the first base station 110 in a radio transmission. According to some embodiments may the signal strength threshold value be preset and obtained from e.g. a memory storage unit within the user equipment 130.

Action 802

An instruction to generate and provide a signal strength measurement report based on a signal received from the second base station 120 is received.

The instruction received from the first base station 110 to generate and provide a signal strength measurement report may further be specified such that the user equipment 130 is instructed to generate the signal strength measurement report on a certain time interval.

The identity of the second base station 120, detected to use a different TDD configuration than the first base station 110 may be received from the first base station 110 in order to correctly identify the second base station 120.

Optionally may the instruction be provided in a downlink assignment, according to some embodiments.

Action 803

The signal strength measurement report is generated, based on the signal strength of a signal received from the second base station 120.

The signal strength measurement report may according to some embodiments be generated by measuring the signal strength of a signal received from the first base station 110, measuring the signal strength of a signal received from the second base station 120 and calculating a ratio between the two measured signal strength values.

However, according to some embodiments may the signal strength measurement report be generated by measuring the Reference Signal Received Power (RSRP) of the first base station 110, measuring the Reference Signal Received Power (RSRP) of the second base station 120 and calculating a ratio between the two measured signal strength values.

Further, according to some embodiments may the signal strength measurement report be generated by measuring the signal strength of a signal received from the second base station 120.

Further may, optionally, the calculated ratio be compared with the signal strength threshold value.

Further, may the first base station 120 indicate in which TTI the user equipment 130 should perform measurements, such as e.g. RSRP measurements, according to some embodiments. Thereby may it be ascertained that the measurements are performed in a downlink subframe even if the TDD configuration of the neighbour cell 125 is different.

Action 804

The generated signal strength measurement report is transmitted to the first base station 110. Thereby is the first base station 110 enabled to allocate resources, such that allocation of resources in TTIs not having the same uplink-downlink direction in the first base station 110 and the second base station 120 respectively, is avoided for the user equipment 130, when the received signal strength measurement report indicates that such allocation is appropriate.

According to some embodiments may the signal strength measurement report be transmitted to the first base station 110 if the ratio between the two measured signal strength values is lower than the signal strength threshold value.

By transmitting the signal strength measurement report when the measured ratio is lower than the signal strength threshold value, redundant uplink traffic is avoided or at least somewhat reduced.

Figure 9:
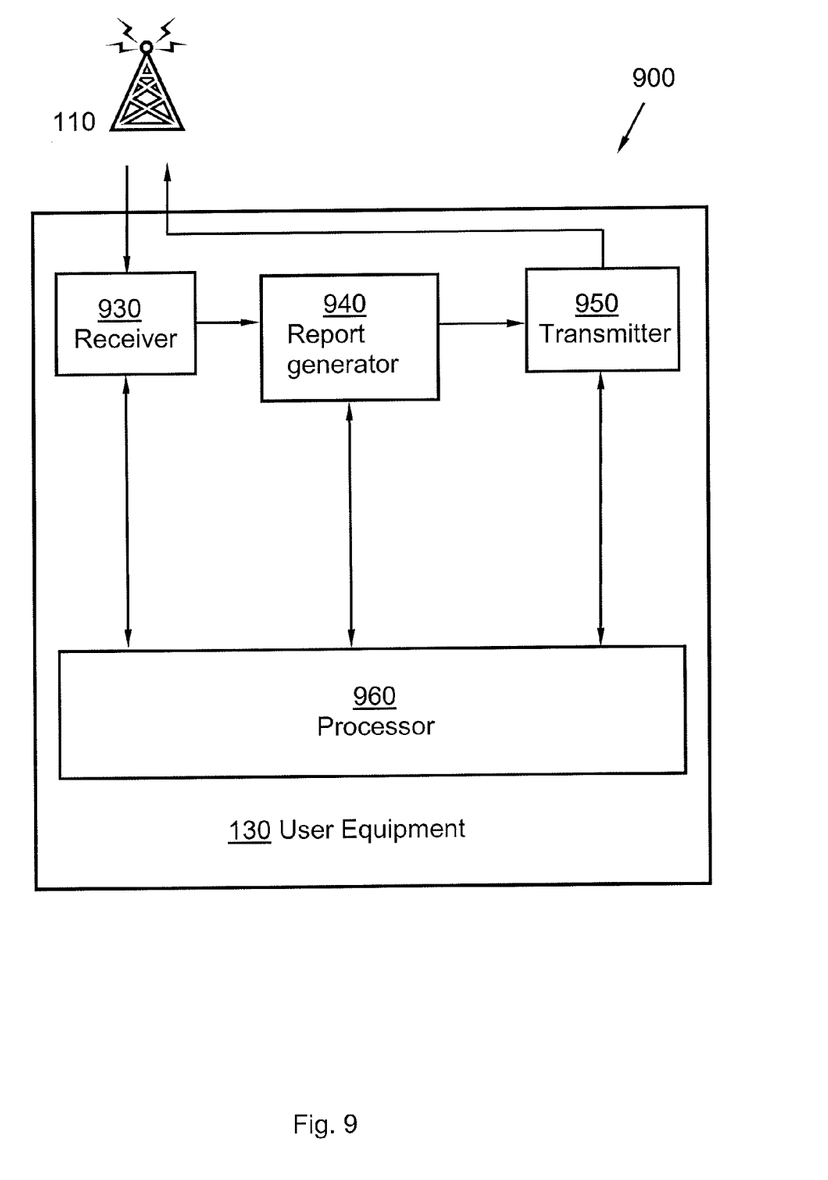
FIG. 9 is a schematic block diagram illustrating an arrangement according to some embodiments.

FIG. 9 schematically illustrates an arrangement 900 in a user equipment 130. The arrangement 900 is configured for scheduling in a Time Division Duplex, TDD, wireless network 100. The wireless network 100 comprises a first base station 110, acting as serving base station for the user equipment 130, and a second base station 120. The arrangement 900 is adapted to perform any, some or all of the actions 801-804 in order to schedule resources in the TDD wireless network 100. The wireless network 100 may be e.g. a LTE radio network. The user equipment 130 may be e.g. a mobile telephone. The first and second base stations 110, 120 may be evolved node Bs, eNBs, according to some embodiments.

In order to perform the actions 801-804 correctly, the arrangement 900 comprises e.g. a receiver 930. The receiver 930 is configured to receive an instruction to generate and provide a signal strength measurement concerning the signal strength of a signal received from the second base station 120. Also, the arrangement 900 comprises a report generator 940. The report generator 940 is configured to generate the signal strength measurement report, based on the signal strength of a signal received from the second base station 120. The report generator 940 may be represented by and/or comprised within a processor, processing circuit or other processing logic that may interpret and execute instructions and being appropriately configured.

Additionally, the arrangement 900 also comprises a transmitter 950. The transmitter 950 is configured to transmit the signal strength measurement report to the first base station 110. Thereby is the first base station 110 enabled to allocate resources, such that allocation of resources in TTIs, not having the same uplink-downlink direction in the first base station 110 and the second base station 120 respectively, is avoided for the user equipment 130, when the received signal strength measurement report indicates that such allocation is appropriate.

In addition, the base station arrangement 900 may comprise a processor 960. The processor 960 may be configured for scheduling in a TDD wireless network 100.

The processor 960 may be represented by e.g. a Central Processing Unit (CPU), a microprocessor, or other processing logic that may interpret and execute instructions. The processor 960 may perform all data processing functions for inputting, outputting, and processing of data including data buffering and device control functions, such as call processing control, user interface control, or the like.

It is to be noted that any internal electronics of the base station arrangement 900, not completely necessary for understanding the present method according to the method actions 801-804 has been omitted from FIG. 9, for clarity reasons.

Further, it is to be noted that some of the described units 930-960 comprised within the arrangement 900 in the user equipment 130 are to be regarded as separate logical entities but not with necessity separate physical entities. To mention just one example, the receiver 930 and the transmitter 950 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first base station 110 and the user equipment 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The actions 801-804 in the user equipment 130 may be implemented through one or more processors 960 in the arrangement 900, together with computer program code for performing the functions of any, some or all of the present actions 801-804. Thus a computer program product, comprising instructions for performing the actions 801-804 in the arrangement 900 may perform scheduling in the TDD wireless network 100, when the computer program product is loaded into the processor 960.

The computer program product mentioned above may be provided for instance in the form of a data carrier carrying computer program code for performing the method actions according to the present solution when being loaded into the processor 960. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the user equipment 130 remotely, e.g. over an Internet or an intranet connection.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method of scheduling resources in a Time Division Duplex (TDD) wireless network that includes a first base station acting as a serving base station for a user equipment, said method performed at the first base station and comprising:
   detecting that a second base station in the wireless network uses a different TDD configuration than the first base station;
   instructing the user equipment to generate and provide a signal strength measurement report based on a signal received in the user equipment from the second base station;
   receiving the signal strength measurement report from the user equipment; and
   determining whether to avoid allocating resources to the user equipment in Time to Transmit Intervals (TTIs) that do not have the same link direction at the first and second base stations, in dependence on the signal strength measurement report.

2. The method of claim 1, wherein determining whether to avoid allocating resources to the user equipment in TTIs that do not have the same link direction at the first and second base stations comprises determining whether a signal strength measurement in the signal strength measurement report is below a signal strength threshold value.

3. The method of claim 2, wherein the signal strength threshold value is set to 3 dB.

4. The method of claim 2, wherein the action of allocating resources to the user equipment, comprises allocating Time to Transmit Intervals, TTIs, having the same link direction, uplink or downlink, in the first base station and in the second base station, for scheduling resources to the user equipment, if the signal strength measurement report provided by the user equipment is lower than the signal strength threshold value.

5. The method of claim 1, further comprising transmitting a signal strength threshold value to the user equipment, and wherein instructing the user equipment to generate and provide the signal strength measurement report includes specifying to the user equipment to send the signal strength measurement report when a signal strength measurement to be reported in the signal strength measurement report is lower than the signal strength threshold value.

6. The method of claim 1, wherein instructing the user equipment to generate and provide the signal strength measurement report includes specifying to the user equipment to send the signal strength measurement report on a certain time interval.

7. The method of claim 1, wherein determining whether to avoid allocating resources to the user equipment in Time to Transmit Intervals (TTIs) that do not have the same link direction at the first and second base stations comprises avoiding such allocation when the signal strength measurement report indicates that a ratio of signal strength or quality at the user equipment for the first base station as compared to the second base station is below a threshold value, and not avoiding such allocation when the ratio is above the threshold value.

8. An arrangement in a first base station configured for use in a Time Division Duplex (TDD) wireless network, the arrangement comprising:
a detection unit configured to detect that a second base station in the wireless network uses a different TDD configuration than the first base station;
a transmitter configured to transmit an instruction to a user equipment for which the first base station is acting as a serving base station, to instruct the user equipment to generate and provide a signal strength measurement report that is based on a signal received at the user equipment from the second base station;
a receiver configured to receive the signal strength measurement report from the user equipment; and
an allocating unit configured to determine whether to avoid allocating resources to the user equipment in Time to Transmit Intervals (TTIs) that do not have the same link direction at the first and second base stations, in dependence on the signal strength measurement report.

9. A method in a user equipment, for enabling scheduling of resources in a Time Division Duplex (TDD) wireless network that includes a first base station acting as serving base station for the user equipment, the method comprising:
receiving an instruction to generate and provide a signal strength measurement report based on a signal received from a second base station in the wireless network that has a different TDD configuration than the first base station;
generating the signal strength measurement report based on a measure of signal strength for a signal received from the second base station; and
transmitting the generated signal strength measurement report to the first base station, to thereby enable the first base station to determine whether to avoid allocating resources to the user equipment in Time to Transmit Intervals (TTIs) that do not have the same link direction at the first and second base stations, in dependence on the signal strength measurement report.

10. The method of claim 9, wherein generating the signal strength measurement report comprises measuring a signal strength for the first base station as seen by the user equipment, measuring a signal strength for the second base station as seen by the user equipment, and calculating a ratio between the two measured signal strengths.

11. The method of claim 9, generating the signal strength measurement report comprises measuring a Reference Signal Received Power (RSRP) of the first base station, measuring a RSRP of the second base station, calculating a ratio between the RSRPs.

12. The method of claim 9, wherein generating the signal strength measurement report comprises determining a ratio of signal strength or quality at the user equipment, as between the first and second base stations, wherein the method further includes at least one of:
indicating the ratio in the signal strength measurement report sent to the first base station; or
triggering said transmitting of the signal strength measurement report to the first base station based on comparing the ratio to a threshold value.

13. The method of claim 9, further comprising obtaining a signal strength threshold value, and wherein said transmitting the signal strength measurement report to the first base station is performed if the signal strength threshold value is exceeded.

14. The method according to claim 9, further comprising generating the signal strength measurement report on a time interval specified by the instruction received from the first base station.

15. An arrangement in a user equipment that is configured for use in a Time Division Duplex (TDD) wireless network, the arrangement comprising:
a receiver configured to receive an instruction from a first base station in the wireless network acting as a serving base station for the user equipment, to generate and provide a signal strength measurement concerning the signal strength of a signal received from a second base station in the wireless network;
a report generator configured to generate the signal strength measurement report based on the signal strength measurement; and
a transmitter configured to transmit the signal strength measurement report to the first base station, to thereby enable the first base station to determine whether to avoid allocating resources to the user equipment in Time to Transmit Intervals (TTIs) that do not have the same link direction at the first and second base stations, in dependence on the signal strength measurement report.

16. A method in a first base station in a Time Division Duplex (TDD) wireless network comprising:
receiving a signal strength measurement report from a user equipment served by the first base station that depends on the strength of a signal received at the user equipment from a second base station; and
determining whether or not to avoid allocating resources to the user equipment in Time to Transmit Intervals (TTIs) for which a link direction is different at the first and second base stations, in dependence on the signal strength measurement report.

* * * * *